United States Patent Office 3,493,555
Patented Feb. 3, 1970

3,493,555
3-PHENYLAZO-2,6-PYRIDYL DICYCLOPROPANE-CARBOXAMIDE
Godfrey Wilbert, Carmel, Seymour Hyden, Spring Valley, and Henry Wetstein, Monroe, N.Y., assignors to Nepera Chemical Co., Inc.
No Drawing. Filed Mar. 23, 1966, Ser. No. 536,663
Int. Cl. C07d *31/44, 29/30;* A01n *9/22*
U.S. Cl. 260—156                          1 Claim

ABSTRACT OF THE DISCLOSURE

The present invention discloses pyridine and piperidine amides of cyclopropanecarboxylic acids. These compounds are prepared by reacting cyclopropanecarboxylic acid chloride with aminopridine or piperidine in a suitable solvent. The compounds are useful as herbicides.

---

This invention relates to a composition of matter and relates more particularly to compounds of the formula:

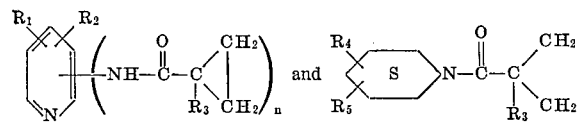

wherein $R_1$ and $R_2$ each represent hydrogen, lower alkyl, halogen, nitro, lower alkoxy, acyl, phenylazo or substituted phenylazo such as nitro, lower alkyl or halogen substituted phenylazo and $R_3$, $R_4$ and $R_5$ each represent lower alkyl and $n$ is an integer from 1 to 2.

As used herein, the term lower alkyl and the alkyl portion of lower alkoxy encompass both straight and branched chain alkyl of 1 to 6 carbon atoms such as methyl, ethyl, propyl and the like. The term halogen includes all four halogens. The term acyl is a residue of a carboxylic acid such as acetyl, propionyl, benzoyl and the like.

This invention also relates to a method for the production of the above compounds.

The compounds of this invention are useful as agricultural herbicides and as intermediates for other herbicides and pharmaceuticals. For use as a herbicide, about 1 part by weight of the compound is dissolved or suspended in about 1 million parts by weight of an aqueous solvent and applied as a spray to plants.

According to the process of this invention, these compounds are prepared by reacting cyclopropanecarboxylic acid chlorides of the formula:

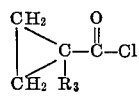

with aminopyridines or piperidines of the formula:

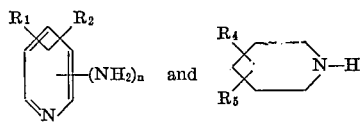

This reaction is effected at a temperature of −10° C. to 50° C. in a solvent system comprising a pyridine or an alkyl pyridine. The desired reaction product may be recovered by diluting the reaction mixture with ice-water, followed by extraction with a solvent such as ether, if necessary. The crude amide may be purified using distillation or crystallization techniques. An alternate procedure comprises reacting methyl cyclopropanecarboxylate with the respective amine in the presence of a metal alkoxide such as sodium methoxide in a solvent such as benzene. This reaction proceeds according to the following equation:

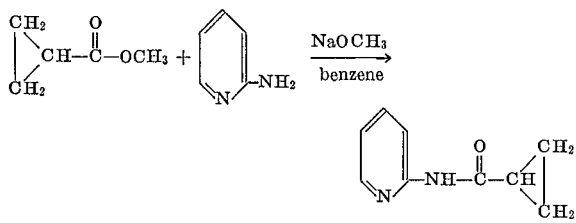

In order further to illustrate the practice of this invention, the following examples are given:

EXAMPLE 1

2-pyridyl cyclopropanecarboxamide

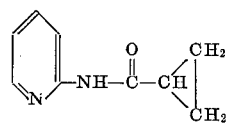

18.8 g. of 2-aminopyridine are dissolved in 30 ml. of pyridine and cooled to 0° C. 20.8 g. of cyclopropanecarboxylic acid chloride are added dropwise, with stirring, while maintaining the temperature at 0° to 20° C. The reaction mixture is then stirred one hour at ambient temperature such as 20 to 30° C. and added to 250 ml. of ice-water to afford 2-pyridyl cyclopropanecarboxamide, a tan solid product. This product, after recrystallization from benzene-hexane has M.P. 89–90° C.

EXAMPLE 2

2,6-pyridyl dicyclopropanecarboxamide

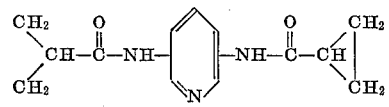

In an analogous manner as described in Example 1, 10.9 g. of 2,6-diaminopyridine and 20.8 g. of cyclopropanecarboxylic acid chloride are reacted in 50 ml. of pyridine at 0° to 20° C. to yield 2,6-pyridyl dicyclopropanecarboxamide. The crude product is obtained by quenching the reaction mixture in ice-water and collecting the residue. The pure diamide, after recrystallization from benzene-hexane, has M.P. 171–173° C.

EXAMPLE 3

5-nitro-2-pyridyl cyclopropanecarboxamide

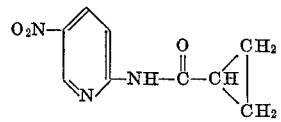

In an analogous manner as described in Example 2, 27.8 g. of 2-amino-5-nitropyridine and 20.8 g. of cyclopropanecarboxylic acid chloride are reacted in 50 ml. of pyridine at 0° to 20° C. to yield 5-nitro-2-pyridyl cyclopropanecarboxamide. The pure amide, after recrystallization from methanol-water, has M.P. 193–194° C.

EXAMPLE 4

3,5-dibromo-2-pyridyl cyclopropanecarboxamide

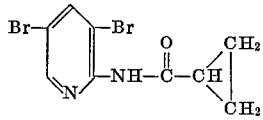

In an analogous manner as described in Example 2, 25.2 g. of 2-amino-3,5 - dibromopyridine and 20.8 g. of cyclopropanecarboxylic acid chloride are reacted in 50 ml. pyridine at 0° to 20° C. to yield 3,5 - dibromo - 2-pyridyl cyclopropanecarboxamide. The pure amide, after recrystallization from methanol-water, has M.P. 189–190° C.

EXAMPLE 5

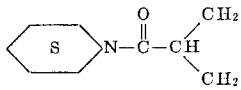

N-piperidyl cyclopropanecarboxamide

In an analogous manner as described in Example 2, 12.8 g. of piperidine and 15.6 g. of cyclopropanecarboxylic acid chloride are reacted in 20 ml. pyridine at 0° to 20° C. to yield N-piperidyl cyclopropanecarboxamide. The pure amide is obtained by distillation at 77–78° C./2–3 mm.

EXAMPLE 6

3-phenylazo-2,6-pyridyl dicyclopropanecarboxamide

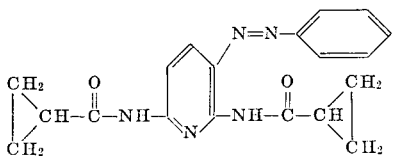

In an analogous manner as described in Example 2, 10.7 g. of 3-phenylazo-2,6-diaminopyridine and 12.0 g. of cyclopropanecarboxylic acid chloride are reacted in 20 ml. pyridine at 0° to 20° C. to yield 3-phenylazo-2,6-pyridyl dicyclopropanecarboxamide. The pure diamide, after recrystallization from methanol-water, has M.P. 104–105° C.

It is understood that the foregoing detailed description is given merely by way of illustration and that many variations may be made therein without departing from the spirit of our invention.

Having described our invention, what we desire to secure by Letters Patent is:

1. 3-phenylazo-2,6-pyridyl dicyclopropanecarboxamide.

References Cited

UNITED STATES PATENTS 3,277,107   10/1966   Neighbors _____ 260—295 XR

OTHER REFERENCES

Smith et al.: J. Am. Chem. Soc., volume 73, pages 4047 to 4049 (1951).

FLOYD D. HIGEL, Primary Examiner

U.S. Cl. X.R.

71—94; 260—293, 294, 295, 296, 544